(12) United States Patent
Janssen et al.

(10) Patent No.: US 11,871,758 B2
(45) Date of Patent: Jan. 16, 2024

(54) POULTRY TRANSFER MECHANISM

(71) Applicant: Marel Poultry B.V., Av Boxmeer (NL)

(72) Inventors: Gijs Berend Gerardus Janssen, Xl Oeffelt (NL); Tim Sander Rijerse, Dr Gemert (NL); Johannes Petrus Maria Linders, Rk Nijmegen (NL)

(73) Assignee: Marel Poultry B.V., Av Boxmeer (NL)

( * ) Notice: Subject to any disclaimer, the term of this patent is extended or adjusted under 35 U.S.C. 154(b) by 213 days.

(21) Appl. No.: 17/436,769

(22) PCT Filed: Mar. 6, 2020

(86) PCT No.: PCT/NL2020/050143
§ 371 (c)(1),
(2) Date: Sep. 7, 2021

(87) PCT Pub. No.: WO2020/180183
PCT Pub. Date: Sep. 10, 2020

(65) Prior Publication Data
US 2022/0174967 A1    Jun. 9, 2022

(30) Foreign Application Priority Data

Mar. 6, 2019    (NL) .................................... 2022680

(51) Int. Cl.
*A22C 21/00*    (2006.01)
(52) U.S. Cl.
CPC ...... *A22C 21/0053* (2013.01); *A22C 21/0007* (2013.01); *A22C 21/0046* (2013.01)
(58) Field of Classification Search
CPC ............ A22C 21/0053; A22C 21/0007; A22C 21/0046

USPC ......................................................... 452/182
See application file for complete search history.

(56) References Cited

U.S. PATENT DOCUMENTS

| 4,178,659 | A | * | 12/1979 | Simonds | ............ | A22C 21/0053 |
| | | | | | | 198/486.1 |
| 5,453,045 | A | * | 9/1995 | Hobbel | .............. | A22C 21/0053 |
| | | | | | | 452/183 |

FOREIGN PATENT DOCUMENTS

| AU | 6606786 A | 6/1987 |
| CN | 103338681 A | 10/2013 |
| CN | 103535424 A | 1/2014 |
| CN | 105307959 A | 2/2016 |
| CN | 108347950 A | 7/2018 |
| EP | 0225306 A2 | 6/1987 |

(Continued)

OTHER PUBLICATIONS

International Search Report and Written Opinion issued in corresponding PCT Application No. PCT/NL2020/050143, dated Jun. 2, 2020 (8 Pages).

(Continued)

*Primary Examiner* — Richard T Price, Jr.
(74) *Attorney, Agent, or Firm* — Osha Bergman Watanabe & Burton LLP

(57) ABSTRACT

The invention relates to a poultry transfer mechanism for transferring poultry bodies from a first poultry transport line to a second poultry transport line. Further, the invention relates to a poultry transport system comprising a poultry transfer mechanism, a first poultry transport line and a second poultry transport line. In addition, the invention also relates to a method for automatically transferring at least one poultry body from a first poultry transport line to a second poultry transport line.

19 Claims, 5 Drawing Sheets

(56) References Cited

FOREIGN PATENT DOCUMENTS

| EP | 2687101 A1 | 1/2014 |
|---|---|---|
| WO | 2006080834 A1 | 8/2006 |

OTHER PUBLICATIONS

Chinese Search Report in corresponding Chinese Application No. 2020800177518, dated Mar. 6, 2020 (5 pages).

\* cited by examiner

POULTRY TRANSFER MECHANISM

The invention relates to a poultry transfer mechanism for transferring poultry bodies from a first poultry transport line to a second poultry transport line. Further, the invention relates to a poultry transport system comprising a poultry transfer mechanism, a first poultry transport line and a second poultry transport line. In addition, the invention also relates to a method for automatically transferring at least one poultry body from a first poultry transport line to a second poultry transport line.

WO2006/080834 A1 discloses a transfer device to be used for example between two conveyor lines. The transfer device comprises a plurality of carriers, each suitable for carrying the legs of the slaughtered poultry product, i.e. in each carrier the two legs can be suspended in cutouts for transferring slaughtered poultry product from the first poultry transport line to the second transport line. The distance between the cutouts in each carrier is fixed. Further, each carrier comprises a unit being moveable over a rail. The carriers can be coupled by coupling means associated with each carrier to a drive member used to move the carriers over the rail. The coupling means between the carriers and the drive member can be decoupled by means of decoupling means. In this known transfer device the conveying of poultry can be controlled to the extent that carriers can be selectively decoupled from the drive member when desired.

The object of the invention is to provide an improved poultry transfer mechanism.

This object is achieved by a poultry transfer mechanism as defined in claim 1.

The poultry transfer mechanism automatically transfers poultry bodies from a first poultry transport line to a second poultry transport line. The poultry transfer mechanism comprises at least one track and shuttles moveable along the track. The shuttles comprise carriers, and each carrier is configured for carrying one leg of a poultry body such that a poultry body to be transferred is carryable by a pair of carriers. In other words, each carrier is configured for carrying a single leg of the two legs of one poultry body only. Hence, in use of the poultry transfer mechanism one poultry body is carried by two carriers. In the poultry transfer mechanism the transfer of the poultry body from a first transport line to the poultry transfer mechanism and/or from the poultry transfer mechanism to a second transport line can be improved, because the poultry transfer mechanism is configured to vary the distance between the carriers of a pair of carriers for varying the distance between the legs of the poultry body. As a result the poultry transfer mechanism can be advantageously implemented between two transport lines having a different pitch (distance) or a different pitch range between the two legs of each poultry body. The pitch between the transport lines may for example vary as a result of different processing steps to be carried out on the poultry body in each transport line. A transport line in this document may be a line being used for more than transporting poultry bodies, for example a transport line may also be configured for processing poultry bodies or making it possible to carry out at least one, and preferably various processing steps on the poultry bodies. In general, a poultry processing plant comprises a number of transport lines, wherein it is not unlikely that a first transport line is manufactured by a different manufacturer than a second transport line and the pitch (distance) between the legs of a single poultry body in the first transport line is larger or smaller than the pitch (distance) between the legs of a single poultry body in the second transport line. By using the poultry transfer mechanism configured to vary the distance between the carriers of a pair of carriers for varying the distance between the legs of the single poultry body, it is possible to connect these transport lines having a different pitch in the poultry processing plant without requiring additional constructional measures.

In addition, the poultry transfer mechanism is able to provide an improved and more flexible transfer, in that by moving at least one carrier of the pair of carriers to the most optimal position for a leg of the poultry body being transported by a first transport line or to be transported by a second transport line, the number of incorrect transfers resulting in falling poultry bodies or poultry bodies carried by one leg only can be reduced significantly. In addition, the transfer of the poultry body between a transport line and the transfer mechanism can be controlled in a better way to reduce misalignments during the transfer, such that damage to the poultry body during the transfer can be reduced. The damage as a result of an incorrect transfer may be visible to the poultry body, such as a twisted leg of the poultry body or cuts in the meat of the poultry body. Such damage is undesired from commercial point of view. The most optimal position of the carrier during use of the poultry transfer mechanism can be determined by using for example a control system/control unit setting the distance between the carriers to the desired distance based on input received, for example from a sensor unit. Further, during a transfer between the first transport line and the second transport line the distance between the carriers can be varied by varying the distance between the legs of the poultry body over a predetermined distance. The forces required for this operation/step can be communicated to the control system/control unit, for example by means of sensors in communication with the control system/control unit. In the control system/control unit, the actual force values are compared with predetermined values or a predetermined force value range. These predetermined values or the predetermined force value range are for example stored in a memory of the control system/control unit or are accessible by the control system/control unit via a communication line. Each type of poultry body to be transferred with the transfer mechanism may have its own predetermined force values or a predetermined force value range for comparison with the actual values. If the difference between the actual force values and the predetermined values or a predetermined value range exceeds a thresh hold, the control system/control may instruct the transfer mechanism to discharge the poultry body, instead of transferring the poultry body to the second transport line. The transfer mechanism may also be configured to transfer the poultry body to a further line or to an inspection line for further inspection. In other words, the transfer mechanism may be configured to use the forces for varying the distance between the legs of the poultry body by means of the carriers as an indicator of the quality of the poultry body being transferred by the transfer mechanism. This quality check may be a separate step in the transfer mechanism during the movement of the poultry body from the first transport line to the second transport line, i.e. in a step before varying the distance between the legs by means of the carriers to correspond to the distance between the legs in the second transport line. However, it is also possible that the above described quality check is performed during the step of varying the distance between the legs to correspond to the distance between the legs in the second transport line.

Further, the poultry transfer mechanism may also vary the distance between the legs of the poultry body carrier by means of the carriers during the transfer to extend/stretch and shorten/squeeze the poultry body by increasing and decreasing the distance between the legs before adjusting the distance to the transfer distance for transferring the poultry body to the second transport line. During the transfer the distance may be increased and decreased a predetermined number of times. This operation can be identified as a processing step of the poultry body which is performed by the poultry transfer mechanism, in that the poultry body is made more flexible during the transfer which may facilitate the transfer between the transfer mechanism and the second transport line and/or may facilitate a further processing step or steps to be carried out on the poultry body, for example after the transfer in the second transport line. Such a processing step of the poultry body may be used if the poultry body received from the first transport line is relatively stiff, for example as a result of the relatively low temperature of the poultry body.

In this document a poultry body means a carcass of a slaughtered product comprising at least two legs, i.e. the poultry body may have wings, a neck, a chess, a head and/or other parts, but it is also possible that the poultry body consists of a carcass with only the two legs.

In one aspect, each shuttle of the poultry transfer mechanism has one carrier of a pair of carriers such that a pair of shuttles comprises a pair of carriers for carrying a poultry body, wherein the poultry transfer mechanism is configured to vary the distance between the carrier of a first shuttle and the carrier of a second shuttle of each pair of shuttles.

In this way a flexible transfer mechanism is provided as each shuttle to be moved along or over the track has a single carrier for carrying a single leg of the poultry body to be transferred. By providing each shuttle with a single carrier for carrying only one leg of the poultry body a relatively simple and robust construction can be obtained for varying the distance between the legs of the poultry body. For varying the distance between the two carriers, it is possible that only one shuttle of each pair of shuttles is configured to be moved independently along the track with respect to the second shuttle of that pair of shuttles. For example, at least one shuttle of each pair of shuttles transferring a poultry body over the track comprises a drive for moving the respective shuttle along the track, wherein for varying the distance this shuttle of the pair of shuttles can be moved independently with respect to the other shuttle of the pair of shuttles by the drive. The drive may be controlled by a control system/control unit of the poultry transfer mechanism. The drive may be an actuator, wherein the forces to be used to vary the distance between the legs of the poultry body may be used as an indicator of the quality of the poultry body being transferred by the poultry transfer mechanism as mentioned above.

It is also possible that each shuttle having a single carrier for carrying one leg of a poultry body can be controlled independently, such that each shuttle can be moved independently over the track. The track may comprise a long stator linear motor, wherein each shuttle comprises at least one magnet such as an electromagnet or a permanent magnet. Such a track provided as a long stator linear motor, makes it possible to manufacture relatively robust shuttles which require minimal maintenance, because the shuttles only require a magnet to be moved independently along the track. By using the long stator linear motor provided as a track, each shuttle provided with a magnet can be driven independently along the track in an accurate manner and in a relatively cost friendly manner. The long stator linear motor track and the shuttles comprising magnets further have the advantage that the sound produced in use of the poultry transfer mechanism is reduced significantly compared to conventional drives of transfer devices such as for example disclosed in WO2006/080834.

In a further aspect, each pair of carriers comprises at least one carrier displaceably mounted on one of the shuttles. In such a poultry transfer mechanism each shuttle may also comprise two carriers for carrying the legs of a single poultry body, wherein at least one of the two carriers of the shuttle is displaceably mounted on the shuttle. It is also possible that each shuttle has a single carrier, wherein the distance between the two shuttles for carrying one poultry body may remain constant in use of the poultry transfer mechanism and the distance between the two carriers can be varied by the at least one carrier displaceably mounted on at least one of the shuttles of each pair of shuttles carrying the poultry body.

It is also possible, that each pair of carriers comprises at least one carrier which is rotatably mounted on one of the shuttles. In this way it is possible for example to change the orientation of the poultry body during a transfer by means of the poultry transfer mechanism and/or to change the orientation of the at least one carrier to optimize a successful transfer between the transfer mechanism and one of the transport lines. During the transfer, the poultry body may also be rotated back and forth over a predetermined rotation angle to perform a quality check by measuring and comparing the forces for rotating at least one leg and/or as a processing step of the poultry body to make the poultry body more flexible, for example to facilitate the transfer to the second transport line and/or to facilitate a subsequent processing step to be carried out on the poultry body. It is also possible to combine rotation of at least one of the legs with a variation in the distance between the legs as discussed above to provide a more accurate quality check and/or to provide a flexible poultry body by means of the transfer mechanism.

Further, the capacity of the poultry transfer mechanism can easily be adjusted by adding and/or removing shuttles in the poultry transfer mechanism, wherein the shuttles can be detachably connected to the track, preferably manually detachable. Hence, an operator can easily adjust the number of shuttles in the poultry transfer mechanism.

The track for the shuttles comprising the carriers may be an endless track.

It is also an object to provide an improved poultry transport system. Such a poultry transport system is provided by claim 14. This poultry transport system comprises a poultry transfer mechanism as disclosed in this document, a first poultry transport line and a second poultry transport line, wherein the poultry transfer mechanism is configured to transfer at least one poultry body from a first poultry transport line to a second poultry transport line, wherein in the first poultry transport line the distance between the legs of the poultry body is different than the distance between the legs of the poultry body in the second poultry transport line.

In addition, it is an object to provide an improved method for automatically transferring at least one poultry body from a first poultry transport line to a second poultry transport line. Such a method is provided by claim 15.

In the method poultry bodies are automatically transferred by means of shuttles moveable along a track from a first poultry transport line to a second poultry transport line, wherein at least one of the poultry bodies is carried by its legs by means of carriers of the shuttles, wherein the distance between the carriers carrying the poultry body is varied for varying the distance between the legs of the poultry body. By means of the method it is possible that during the transfer from the first transport line to the second transport line the pitch between the legs of one single poultry body is adjusted, for example to facilitate the transfer between the transfer mechanism and the second transport line. It is for example possible that in the first poultry transport line the distance (pitch) between the legs of the transported poultry body is different than the distance between the legs of the transported poultry body in the second poultry transport line. The distance between the carriers for carrying each a leg of the poultry body may be varied at any given moment. During the transfer the distance between the legs of the poultry body may be made longer and shorter by means of the carriers of the shuttles. This processing step on the poultry body provides a more flexible poultry body for the transfer to the second transport line and/or a subsequent processing step to be carried out on the poultry body. This step may also be repeated a number of times during the transfer in the transfer mechanism.

In one aspect of the method the moving speed of a first shuttle comprising a first carrier for carrying a leg of the poultry body is varied with respect to the moving speed of a second shuttle comprising a second carrier for carrying the other leg of the poultry body. These speed differences may be used to vary the distance between the legs of a poultry body being transferred and/or may be used to facilitate a successful transfer.

In one further aspect at least one of the carriers carrying the legs of the poultry body can be rotated with respect to the shuttle of this carrier. In this way, it is possible to change the orientation of the poultry body carried by the carriers for example to adjust the orientation to a desired operation to be executed in the second poultry transport line. Further, it is possible to rotate the carrier with respect to the shuttle to change the orientation of the at least one carrier to optimize a successful transfer between the transfer mechanism and one of the transport lines.

The present invention will be explained in more detail below with reference to the appended figures showing exemplary embodiments, in which.

Figure 1:
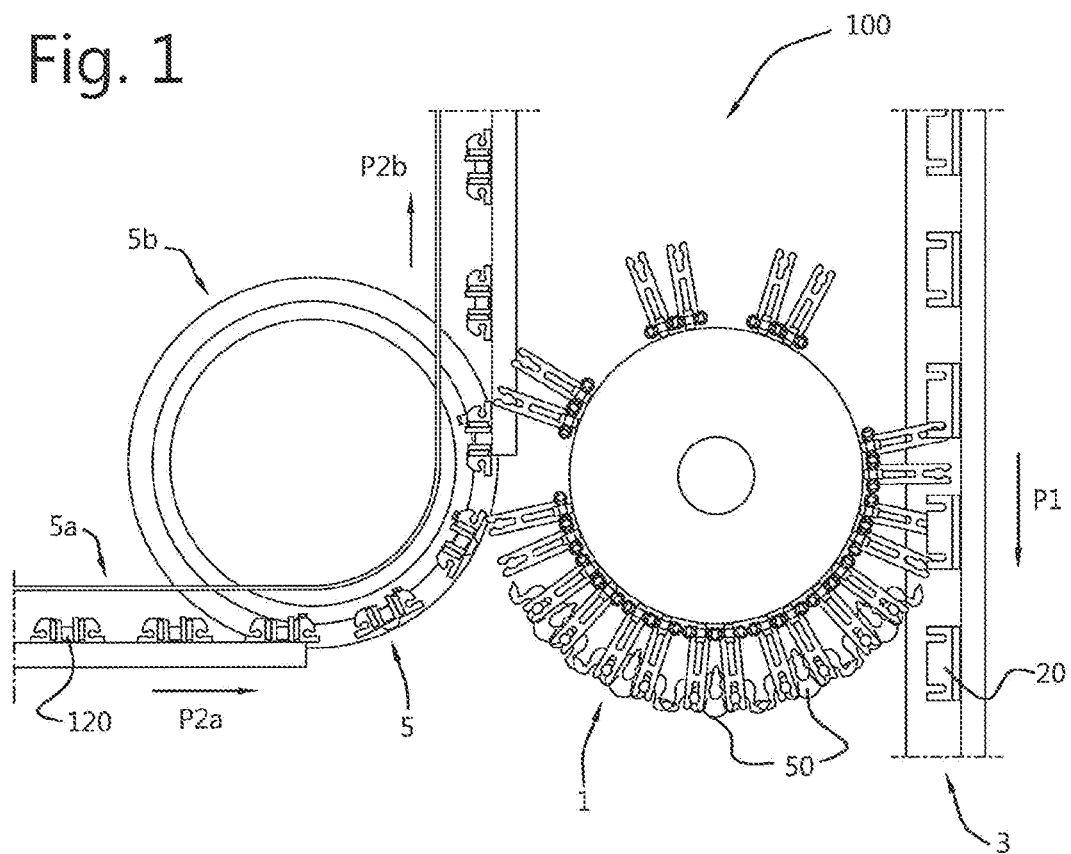
FIG. 1 is a diagrammatic top view of a poultry transport system.

FIGS. 6a-d show various schematic top views of transferring a poultry body between a poultry transfer mechanism and the second transport line.

In the following description identical or corresponding parts have identical or corresponding reference numerals. Each feature disclosed with reference to a specific figure can also be combined with another feature disclosed in this disclosure, unless it is evident for a person skilled in the art that these features are incompatible.

Figure 2:
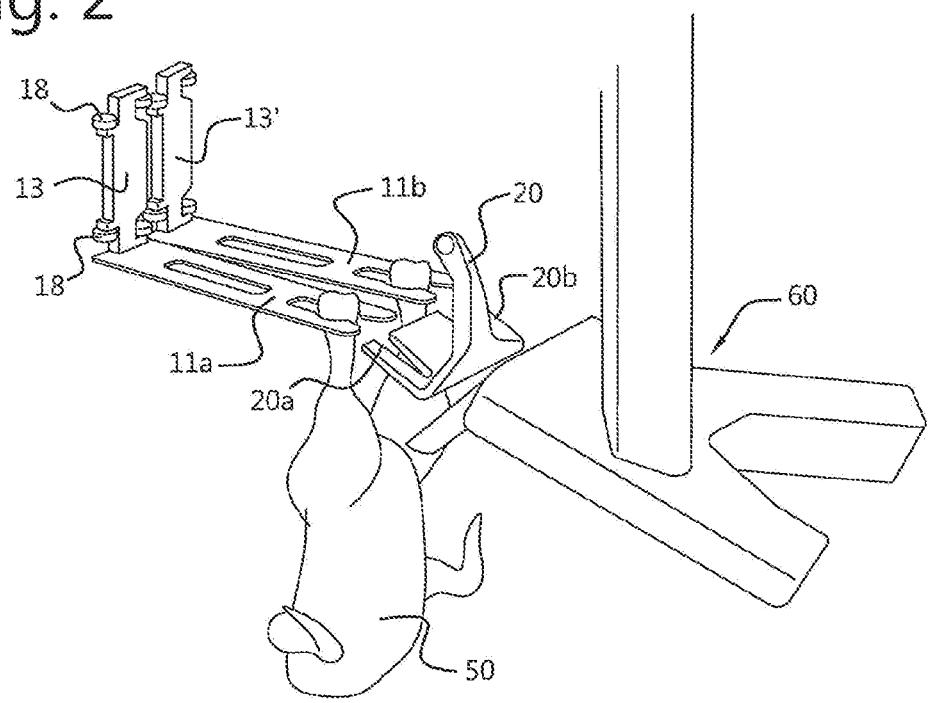
FIG. 2 is a perspective view of a transfer between a first transport line and a poultry transfer mechanism.
Figure 3:
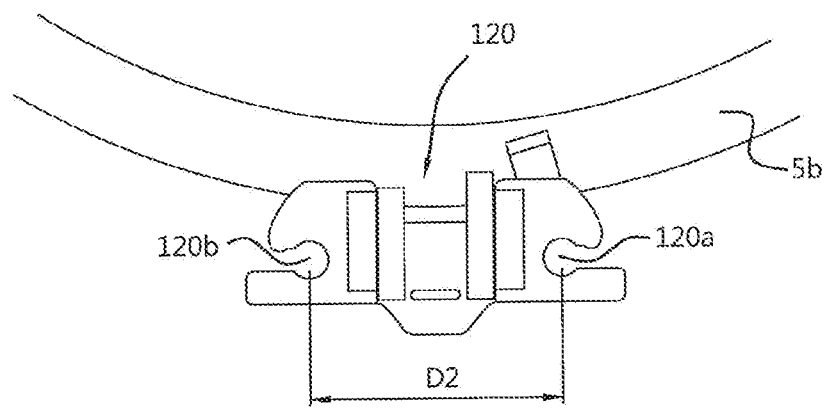
FIG. 3 is a top view of a shackle in a section of a second transport line.

FIG. 1 shows a diagrammatic topview of a poultry transport mechanism 100 which comprises a poultry transfer mechanism 1, a first transport line 3 having a transport direction indicated by arrow P1 and a second transport line 5 having a first transport direction for empty shackles towards the poultry transfer mechanism 1 indicated by arrow P2a and a second transport direction away from the poultry transfer mechanism 1 indicated by arrow P2b. Seen from above the angle between the transport directions indicated by arrows P2a and P2b is approximately 90 degrees. Shackles 20 (FIG. 2); 120 (FIG. 3) are used in the first transport line 3 and second transport line 5 to carry the legs of a poultry body 50. Each shackle 20; 120 has two cutouts 20a, 20b; 120a, 120b for the two legs of a single poultry body 50 and optionally clamping means to clamp a leg of the poultry body in the cutout 20a, 20b; 120a, 120b. The distance (pitch) between the two cutouts 20a, 20b; 120a, 120b in each shackle 20; 120 is fixed, i.e. for example the distance between the cutouts 20a, 20b in each shackle 20 in the first transport line 3 is 15 cm, wherein the distance between the cutouts 120a, 120b in each shackle 120 in the second transport line 5 is 20 cm. The second transport line 5 has a shackle opening mechanism 5a for opening and rotating a shackle 120 and a positioning wheel 5b for positioning a shackle 120 with respect to the poultry transfer mechanism 1. FIG. 3 shows the shackle 120 and a portion of the positioning wheel 5b.

The poultry body 50 is conveyed by the first transport line 3 towards the poultry transfer mechanism 1. As shown in FIG. 2, the poultry body 50 is being transferred from the shackle 20 of the first transport line 3 towards carriers 11a, 11b of the poultry transfer mechanism 1 by means of a pusher unit 60.

Figure 4:
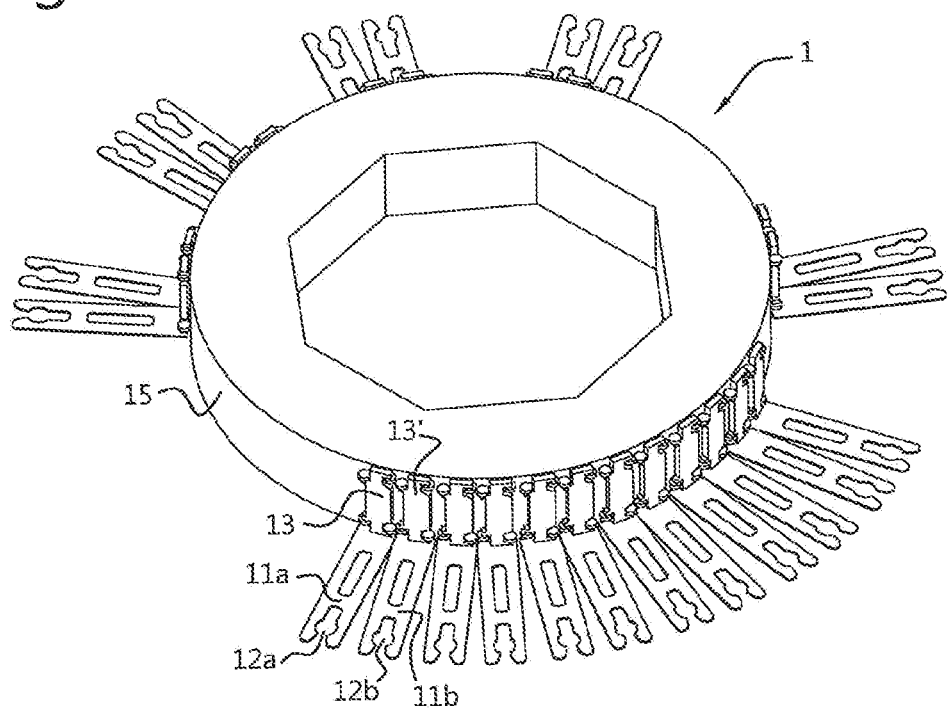
FIG. 4 is a diagrammatic perspective top view of a poultry transfer mechanism.
Figure 5:
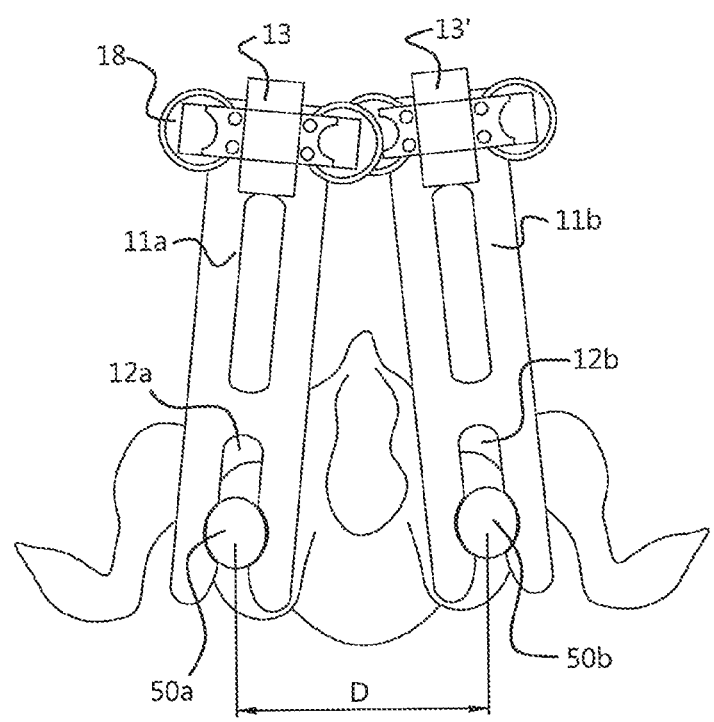
FIG. 5 is a top view of two carriers attached to two shuttles of the poultry transfer mechanism carrying a poultry body.

FIGS. 4 and 5 show details of the poultry transfer mechanism 1. The poultry transfer mechanism 1 for transferring poultry bodies from a first poultry transport line 3 to a second poultry transport line 5 comprises at least one track, i.e. an endless track 15 and shuttles 13, 13' moveable along the track 15. Each shuttles 13, 13' comprises wheels 18 providing additional support to the shuttle 13, 13' and bearings (not shown). The shuttles 13, 13' comprise the carriers 11a, 11b, and as shown in detail in FIG. 5 each carrier 11a, 11b is configured for carrying one leg 50a, 50b of a poultry body 50 such that a poultry body 50 to be transferred is carryable by a pair of carriers 11a, 11b. The poultry transfer mechanism 1 is configured to vary the distance between the carriers 11a, 11b of a pair of carriers for varying the distance D (FIG. 5) between the legs 50a, 50b of the poultry body 50.

In the example of the poultry transfer mechanism 1 shown in the figures, each shuttle 13, 13' has its own carrier 11a, 11b for carrying only one leg of a poultry body in a cutout 12a, 12b. Each shuttle 13, 13' can be controlled independently by means of a control unit (not shown) for controlling the distance between the carriers 11a, 11 b of each pair of carriers 11a, 11 b, such that each shuttle 13, 13' can be moved independently over the track 15 in an accurate manner. The track 15 is a long stator linear motor, wherein each shuttle 13, 13' comprises at least one magnet (not shown) such as an electromagnet or a permanent magnet. Such a track 15 makes it possible to manufacture relatively robust shuttles which require minimal maintenance, because the shuttles 13, 13' only require a magnet to be moved independently along the track. During the movement along the track 15 the distance D between two carriers 11a, 11b of a pair of shuttles 13, 13' may be varied by changing the speed between the shuttles 13, 13'. As shown in FIGS. 1 and 4 the poultry transfer mechanism 1 comprises a relatively large number of shuttles forming pairs of shuttles like shuttles 13, 13' to carry a single poultry body 50. Hence, for transporting a single poultry body along the track 15 of the poultry transfer mechanism 1 two shuttles 13, 13' are required and to each shuttle 13, 13' a carrier 11a, 11b is attached to carry one leg of the poultry body 50 only.

As mentioned above the first transport line 3 has shackles 20 having a different distance (pitch) between the cutouts 20a, 20b than the shackles 120 of the second transport line 5. Hence, by using the transfer mechanism 1 as explained above it is possible to change the distance D between the legs 50a, 50b of the poultry body 50 during the transfer from the first transport line 3 to the second transport line 5. During the transfer step shown in FIG. 2 the legs are positioned in the carriers with a distance D1 (not shown in FIG. 2) between the legs, wherein during the transfer by means of the poultry transfer mechanism 1, the distance D1 is adapted, more specific increased, to a distance D2 (FIG. 3) for transferring the poultry body 50 to the shackle 120 of the second transport line 5.

The transfer operation whether a poultry body 50 is being transferred from the first transport line 3 to the transfer mechanism 1 may be selective, for example based on quality and/or weight of the poultry body 50. Further, the transfer mechanism 1 is configured to perform a quality control during the transfer. The quality control may be performed during the transfer by measuring the forces required to vary the distance between the legs over a predetermined distance. In a control system/unit, the measured actual forces may be compared by predetermined forces or a predetermined force range. If the difference between the actual force values and the predetermined values or a predetermined value range exceeds a thresh hold, the control system/control may instruct the transfer mechanism to discharge the poultry body, instead of transferring the poultry body to the second transport line. An additional advantage of the long stator linear motor is that such a motor provides accurate force values for varying the distance between the legs for a control system/unit without requiring any additional sensors or other structural modifications. Further, the transfer mechanism 1 is configured to perform a processing step during the transfer, in that during the transfer the distance between the legs of the poultry body can be increased and decreased for stretching and squeezing the poultry body, for example a predetermined number of times. As a result the poultry body is made more flexible in the transfer mechanism which may be beneficial for the transfer or in any subsequent processing steps to be performed on the poultry body.

During the transfer in the poultry transfer mechanism 1 the poultry bodies 50 may be buffered as is shown in FIG. 1, for example as a result of the speed difference between the transport lines 3, 5. An advantage is that the shuttles 13, 13' can be independently controlled over the track 15 such that the transfer mechanism 1 requires no special constructional measures for buffering the poultry bodies in the transfer mechanism 1.

The track 15 may be divided in various sections, for example a loading track section near the first transport line 3, an unloading track section near the second transport line 5 and at least one intermediate track section between the loading track section and the unloading track section. In the intermediate track section and/or in the loading track section the distance between the carriers in each pair of carriers for carrying a poultry body may be kept constant. As will be explained below with respect to FIGS. 6a-d, in the unloading track section the poultry transfer mechanism may be configured to vary a moving speed along the track of the first shuttle 13 of each pair of shuttles 13, 13' with respect to the moving speed of the second shuttle 13' of each pair of shuttles 13, 13'. These speed differences may be used to vary the distance between the legs 50a, 50b of a poultry body 50 being transferred and may be used to facilitate, improve and accelerate a successful transfer.

Figure 6A:
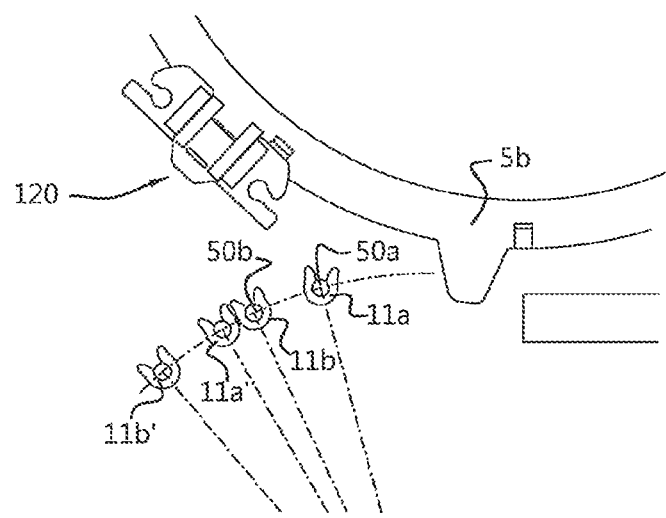
Figure 6B:
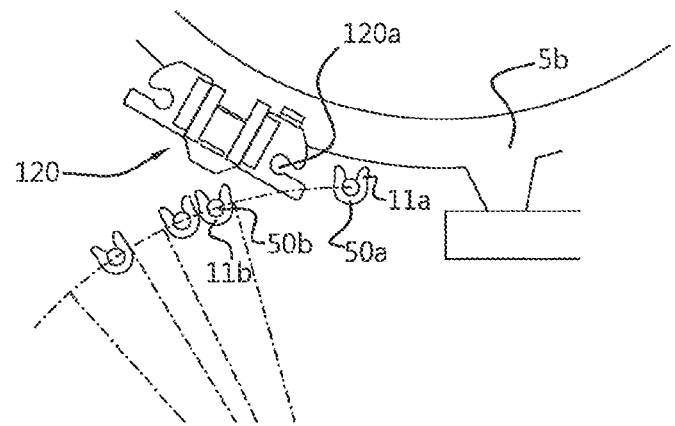
Figure 6C:
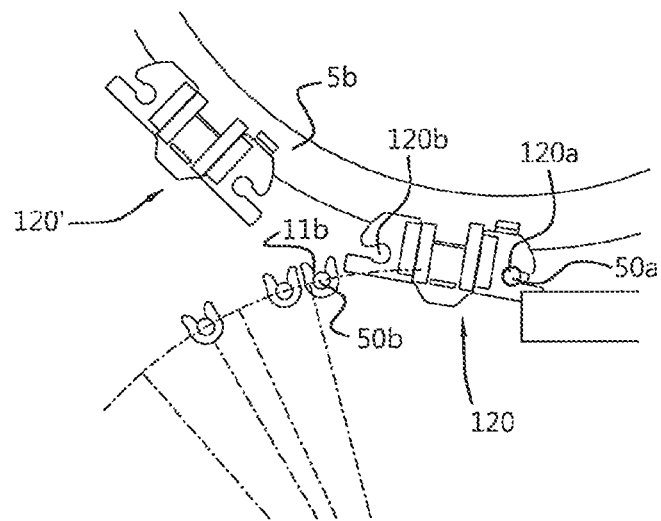
Figure 6D:
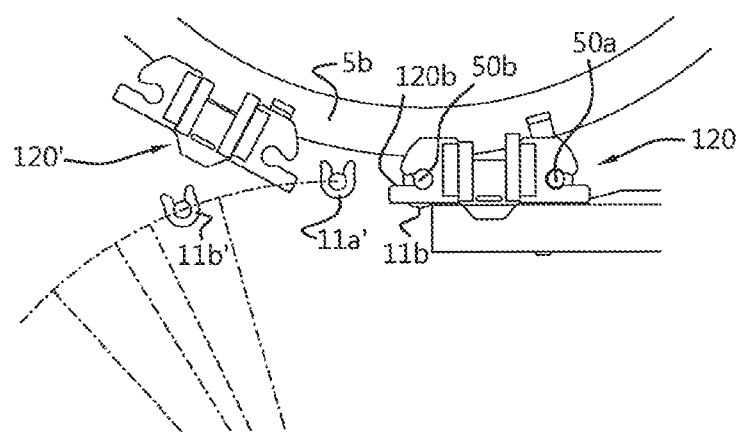

FIGS. 6a-d show in the unloading track section of the transfer mechanism 1 the transfer of a poultry body from the poultry transfer mechanism 1 to the second transport line 5, in particular shackles 120 and the positioning wheel 5b of the second transport line 5 for positioning the shackles 120 with respect to the poultry transfer mechanism 1. In FIG. 6a the shackle 120 and the carriers 11a, 11b, 11a', 11b' are moving towards each other. In FIG. 6b the shuttle (not shown) attached to the carrier 11a is moving one leg of the poultry body in front of the cutout 120a of the shackle 120. The distance between the legs 50a, 50b of the poultry body 50 supported in the carriers 11a, 11b has been increased between the situations depicted in FIGS. 6a and 6b by increasing the moving speed of the shuttle attached to carrier 11a with respect to the moving speed of the shuttle attached to carrier 11b. In FIG. 6c it is shown that the leg 50a is positioned in the cutout 120a of the shackle 120. Further, it is shown that the distance between the carriers 11a, 11b is further increased by slowing down the second carrier 11b or even stopping the second carrier 11b such that the shackle 120 is able to pass the second carrier 11b. Then, as shown in FIG. 6d, the second carrier 11b accelerates to catch up the shackle 120 and to push the leg 50b of the poultry body into the cutout 120b of the shackle 120. Then the shackle 120 will close to transport the poultry body by means of the second transport line 5 in the direction shown by arrow P2b in FIG. 1. FIG. 6d also shows a new pair of carriers 11a', 11b' in the position with respect to a new shackle 120' as explained in FIG. 6b.

A transfer using a varying distance between the carriers 11a, 11b reduces the number of incorrect transfers drastically. An incorrect transfer may result in a poultry body carried in the second transport line 5 by one leg only. The latter is undesired as additional actions/constructional measures for unloading such an incorrect carried poultry body in the second transport line 5 are then required.

By moving the carriers 11a, 11b with respect to each other, i.e. by varying the distance therebetween, it is also possible to optimize the receiving position of the carriers 11a, 11b for the transfer of a poultry body between the first transport line 3 and the transfer mechanism 1.

The shuttles 13, 13' are manually detachably connected to the track 15, such that an operator can easily adjust the number of shuttles in the poultry transfer mechanism 1.

It is further possible that each pair of carriers comprises at least a carrier (not shown) displaceably mounted on one of the shuttles and/or that each pair of carriers comprises at least carrier (not shown) which is rotatable mounted on one of the shuttles.

In addition, a first shuttle of each pair of shuttles may be configured to be moved independently along the track with respect to the second shuttle of each pair of shuttles by means of a drive (not shown) in the shuttle for moving the shuttle along the track independent of the other shuttle of each pair of shuttles. The drive may be wireless connected to a control system/control unit.

The invention claimed is:

1. A poultry transfer mechanism for transferring poultry bodies from a first poultry transport line to a second poultry transport line, the poultry transfer mechanism comprising:
at least one track; and
shuttles moveable along the track, wherein the shuttles comprise carriers, and each carrier is configured for carrying one leg of a poultry body such that a poultry body to be transferred is carryable by a pair of carriers, wherein each shuttle has one carrier of the pair of carriers such that a pair of shuttles comprises the pair of carriers for carrying the poultry body, and wherein the poultry transfer mechanism is configured to vary the distance between the carrier of a first shuttle and the carrier of a second shuttle of each pair of shuttles for varying the distance between the legs of the poultry body.

2. The poultry transfer mechanism according to claim 1, wherein at least a first shuttle of each pair of shuttles is configured to be moved independently along the track with respect to the second shuttle of each pair of shuttles.

3. The poultry transfer mechanism according to claim 1, wherein at least one shuttle of each pair of shuttles comprises a drive for moving the shuttle along the track independent of the other shuttle of each pair of shuttles.

4. The poultry transfer mechanism according to claim 1, wherein the poultry transfer mechanism comprises a control unit for controlling the distance between the carriers of each pair of carriers.

5. The poultry transfer mechanism according to claim 1, wherein the shuttles are manually detachably connected to the track.

6. The poultry transfer mechanism according to claim 1, wherein the track comprises a long stator linear motor, wherein each shuttle comprises at least one magnet such as an electromagnet or a permanent magnet.

7. The poultry transfer mechanism according to claim 1, wherein each shuttle can be driven independently along the track.

8. The poultry transfer mechanism according to claim 1, wherein the track has a loading track section, an unloading track section and at least one intermediate track section between the loading track section and the unloading track section.

9. The poultry transfer mechanism according to claim 8, wherein in the intermediate track section the distance between the carriers in each pair of carriers for carrying a poultry body is constant and/or in the loading track section the distance between the carriers in each pair of carriers for carrying a poultry body is constant.

10. The poultry transfer mechanism according to claim 9, wherein in the unloading track section the poultry transfer mechanism is configured to vary a moving speed along the track of the first shuttle of each pair of shuttles with respect to the moving speed of the second shuttle of each pair of shuttles.

11. The poultry transfer mechanism according to claim 1, wherein each pair of carriers comprises at least one carrier displaceably mounted on one of the shuttles.

12. The poultry transfer mechanism according to claim 1, wherein each pair of carriers comprises at least one carrier which is rotatably mounted on one of the shuttles.

13. A poultry transport system comprising:
a poultry transfer mechanism according to claim 1;
a first poultry transport line; and
a second poultry transport line, wherein the poultry transfer mechanism is configured to transfer at least one poultry body from the first poultry transport line to the second poultry transport line, wherein in the first poultry transport line the distance between the legs of the poultry body is different than the distance between the legs of the poultry body in the second poultry transport line.

14. A method for automatically transferring poultry bodies by means of shuttles moveable along a track from a first poultry transport line to a second poultry transport line, the method comprising:
carrying at least one of the poultry bodies by its legs by carriers of the shuttles,
wherein the distance between the carriers carrying the poultry body is varied for varying the distance between the legs of the poultry body, and
wherein in the first poultry transport line the distance between the legs of the transported poultry body is different than the distance between the legs of the transported poultry body in the second poultry transport line.

15. The method according to claim 14, wherein the distance between the carriers for carrying each a leg of the poultry body is varied at any given moment during the transfer.

16. The method according to claim 14, wherein the moving speed of a first shuttle comprising a first carrier for carrying a leg of the poultry body is varied with respect to the moving speed of a second shuttle comprising a second carrier for carrying the other leg of the poultry body.

17. The method according to claim 14, wherein at least one of the carriers carrying the legs of the poultry body is rotated with respect to the shuttle of this carrier.

18. The method according to claim 14, wherein the distance between the legs of the poultry body is increased and decreased a predetermined number of times during the transfer.

19. The method according to claim 14, wherein the poultry body is transferred by a poultry transfer mechanism comprising:
at least one track, and
shuttles moveable along the track, wherein the shuttles comprise carriers, and each carrier is configured for carrying one leg of a poultry body such that a poultry body to be transferred is carryable by a pair of carriers,
wherein the poultry transfer mechanism is configured to vary the distance between the carriers of a pair of carriers for varying the distance between the legs of the poultry body.

\* \* \* \* \*